United States Patent [19]

Press et al.

[11] Patent Number: 5,127,048

[45] Date of Patent: Jun. 30, 1992

[54] FREE STANDING DATA TRANSFER DEVICE FOR COUPLING A FACSIMILE MACHINE TO A TELEPHONE LINE

[75] Inventors: Bernard Press, San Diego; Robin R. Cooper, La Mesa, both of Calif.

[73] Assignee: Fisk Communications, Inc., La Mesa, Calif.

[21] Appl. No.: 552,911

[22] Filed: Jul. 16, 1990

Related U.S. Application Data

[63] Continuation-in-part of Ser. No. 522,535, May 11, 1990.

[51] Int. Cl.⁵ .................................... H04M 11/00
[52] U.S. Cl. ............................ 379/100; 358/442; 369/180; 360/98.04
[58] Field of Search ............ 369/178, 180, 202, 191; 358/400, 402, 403, 442, 444, 468; 379/90, 93, 96-98, 100; 360/98.01, 98.04

[56] References Cited

U.S. PATENT DOCUMENTS

| | | | |
|---|---|---|---|
| 4,502,080 | 2/1985 | Tsuda | 379/100 |
| 4,587,633 | 5/1986 | Wang et al. | 358/403 |
| 4,693,659 | 9/1987 | Burke et al. | 360/98.04 |
| 4,827,349 | 5/1989 | Ogata et al. | 358/434 |
| 4,897,735 | 1/1990 | Oneda | 358/403 |
| 4,910,607 | 3/1990 | Kita et al. | 358/400 |
| 4,912,575 | 3/1990 | Shiosaki | 369/191 |

FOREIGN PATENT DOCUMENTS

| | | | |
|---|---|---|---|
| 57-111856 | 7/1982 | Japan | 369/180 |
| 59-224964 | 12/1984 | Japan | 358/400 |

Primary Examiner—James L. Dwyer
Assistant Examiner—Wing F. Chan
Attorney, Agent, or Firm—Kenyon & Kenyon

[57] ABSTRACT

A free standing data transfer device is arranged to couple a facsimile machine to a telephone line. The data transfer device includes a processor coupled to each of a modem, a computer controlled switch mechanism and a data storage device. A telephone input terminal is adapted to couple the telephone line to each of the modem and a telephone output terminal, that is, in turn, adapted for coupling to the facsimile machine. The computer controlled switch mechanism intercouples the input and output terminals for control of the connection to the facsimile machine by the processor via the processor coupling to the switch mechanism. In this manner, the device of the present invention provides a direct, in-line coupling for the facsimile machine vis-a-vis the telephone line. Provisions is provided for input of data transmission control information is coupled to the processor so that the processor operates the computer controlled switch mechanism and the data storage device so as to cause the transmission of electronically represented data transmitted over the telephone line from the input telephone terminal only directly to the facsimile machine coupled to the output telephone terminal via the computer controlled switch mechanism, only to the data storage device via the modem and the processor or to both the facsimile machine and the data storage device, as a function of the data transmission control information.

16 Claims, 5 Drawing Sheets

FREE STANDING DATA TRANSFER DEVICE FOR COUPLING A FACSIMILE MACHINE TO A TELEPHONE LINE

RELATED INVENTION

This application is a continuation-in-part of copending U.S. application Ser. No. 07/522,535, entitled "A Companion To A Facsimile Machine That Will Transfer And Receive Data On A Floppy Disk," filed on May 11, 1990.

TECHNICAL FIELD

The invention relates to a system for transmitting binary data, picture data, or text data from a storage medium to another person at a work station remote from the storage medium. The magnetic medium that could be used is floppy disk, hard disk, magnetic tape, or optical disk. In order to reduce redundancy, however, the medium that will be primarily described is a computer floppy disk.

BACKGROUND ART

Presently businesses that have FAX machines have them connected to telephone lines whose only use is for transmitting and receiving letters, drawings, and similar material. This results in the FAX telephone line being unused a considerable portion of the day.

There are also times when individuals or offices wish to transmit a complete diskette or certain files from their diskettes to a person located remotely from the person sending that data. With use of applicant's novel free standing data transfer device, it is possible for the user to transmit complete diskettes or files from diskettes over the same telephone line that has been set aside specifically for FAX communications.

It is an object of the invention to provide a novel system for transmitting binary data, picture data, or text data from a computer floppy disk or other storage medium.

It is also an object of the invention to provide a novel free standing data transfer device that is compatible with existing FAX machines so that the data transfer device can be connected in series with a FAX machine.

It is another object of the invention to provide a novel free standing data transfer device that allows the telephone line devoted to the FAX machine to have a multiple purpose.

Currently the only way to remotely transfer computer files is by using two computers, connected to two modems, each connected to a telephone line. This configuration poses no problem to the sending party, however, it is a major problem to the receiving party for the following reasons:

The receiving party's computer must be turned on

A modem must be connected to the computer and turned on

The modem must be able to handle the proper transmission speed (baud rate)

A communications software program must be loaded into the computer's memory and be set to "wait" for a phone call Certain switches in the communications software must be properly set (baud rate, parity, stop bits etc.)

There must be enough disk space available to successfully transfer the file

Also, once a person has established communication with a remote computer, they often have the ability to browse into areas where sensitive or secret material might be kept.

Additionally, in order for an office to have a computer dedicated to sending and receiving data files, there would need to be a substantial investment in the basic computer equipment. Plus the communications equipment, plus the additional phone line, plus the training involved in showing someone how to handle a system or power failure.

Therefore, if a device could be made available that was designed to share the phone line already dedicated to the FAX, was properly set to receive a transmission as soon as it was turned on, required virtually no training for it's basic functions, gave the user countless options for both sending and receiving data, and was cost effective, then data file transmissions would become more common place therefore lowering a company's "overnight mail" costs, allowing the data to arrive almost immediately, eliminate the need to re-key information into another computer, and offer the receiving party different options for either storing or printing the information.

DISCLOSURE OF INVENTION

The novel system for transmitting binary data, picture data, or text data from a computer floppy disk utilizes a unit known as a free standing data transfer device. The data transfer device of the present invention has a CPU, a sending disk drive, a receiving disk drive, a diskette autoloader, an LCD display, a keyboard, a modem, a phone input terminal and a phone output terminal, a serial port, and a parallel port, a tray to hold ejected diskettes, and a labeling mechanism. The free standing data transfer device could also be expanded to include a hard disk, a magnetic tape machine, and an optical disk drive.

The data transfer device has a first telephone line from an existing phone outlet connected to the phone input terminal of the data transfer device, which line is connected through the device to the phone outlet terminal. A second line has one end connected to the phone output terminal of the data transfer device and its other end connected to the phone input terminal of a FAX machine.

A typical application for the free standing data transfer device according to the present invention is when the user wishes to send data disk-to-disk to another person at a remote work station or location. The user does not want the FAX machine to be involved. The sender puts in a disk, selects a predetermined program on the keyboard telling the data transfer device what functions he wants it to do, such as dial the telephone of the recipient of the data. Next the data transfer device at the remote site answers the telephone and it understands the information is to be transmitted to its disk drive. The sender machine asks if a disk drive is available and the receiver data transfer device answers, yes there is. The sending device then tells the receiver device it wants to send data and information that is to go on a disk. The receiver is also supposed to place a label on the disk, and eject it from the machine. When the receiving device responds everything is clear, the transmission begins. When it is finished the receiving data transfer device labels the diskette and ejects it from the machine.

The data transfer device also has other capabilities when it reaches a receiver that only has a FAX machine. In this instance the sender internally determines whether the data is text data or picture data. If it is text or picture data the sending data transfer device then sends the appropriate encoded picture signal data to the FAX which will produce printed pages of information. The free standing data transfer device can also receive information from an incoming call whether it is from a FAX or another FISK.

Also the free standing data transfer device will monitor all transmissions going over the phone line to the FAX. If there are no instructions for the free standing data transfer device to take control, then it will remain idle. As soon as the free standing data transfer device detects a new phone call and an instruction to take control, it will first disconnect the FAX machine. The free standing data transfer device will then find out if a new diskette is required, or if the data is to be transferred to the existing diskette in the receiver disk drive. If a new diskette is required, the free standing data transfer device will eject the old diskette into a disk tray in front of the unit, pull down a new diskette from the autoloader above, and start receiving the transmission. As soon as the transmission has ended, the free standing data transfer device will terminate the call. If the sender specifies a new diskette, the free standing data transfer device will print the desired label (information supplied by way of a keyboard command from the sender), place the label on the diskette, eject the disk into the disk tray, and pull down another diskette from above.

An additional feature of the FISK console unit is it determines the formatting of a diskette. When the receiver disk pulls a new diskette into the receiver disk drive it can determine if the diskette has not been formated (if no directory information can be found), or if the formatting does not match the sending diskette. The data transfer can then format the disk appropriately.

The data transfer device will also appropriately handle error conditions. If a disk is full, then the data transfer device will label the disk, eject the disk into the disk tray in front, pull down a new disk from above, format the disk if necessary, and continue the transmission. If a failure to write to a disk occurs, the data transfer device will label the disk with the words "a failure occured while trying to write to this disk." On the disk, eject the disk into the disk tray in front, pull down a new disk from above, format the disk if necessary, and continue the transmission. If the sending data a transfer device encounters a failure to read part of all of a disk in the sending disk drive, then the data transfer device will terminate the transmission, display the message "a failure occured while trying to read this disk." Will appear on the LCD display, and a bell will continue to sound until the user presses a key on the keyboard.

BEST MODE FOR CARRYING OUT THE INVENTION

Figure 1:
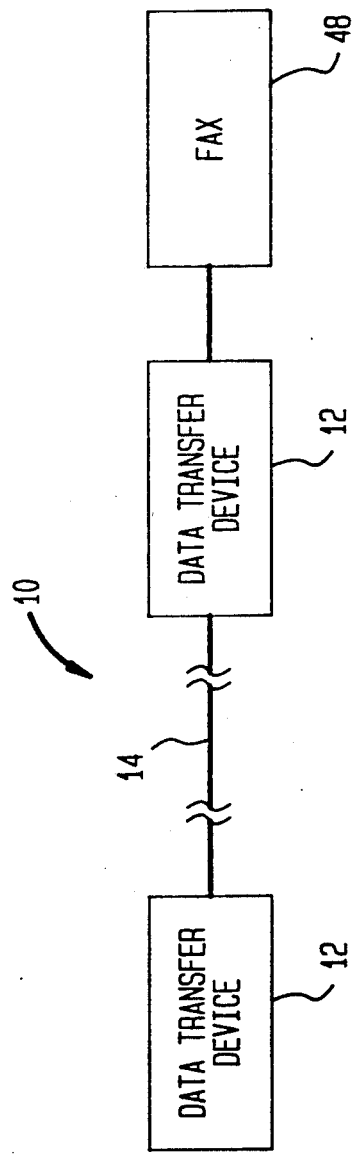
FIG. 1 is a block diagram illustrating the manner in which a free standing data transfer device according to the present invention is connected to a remote free standing data transfer device.
Figure 2:
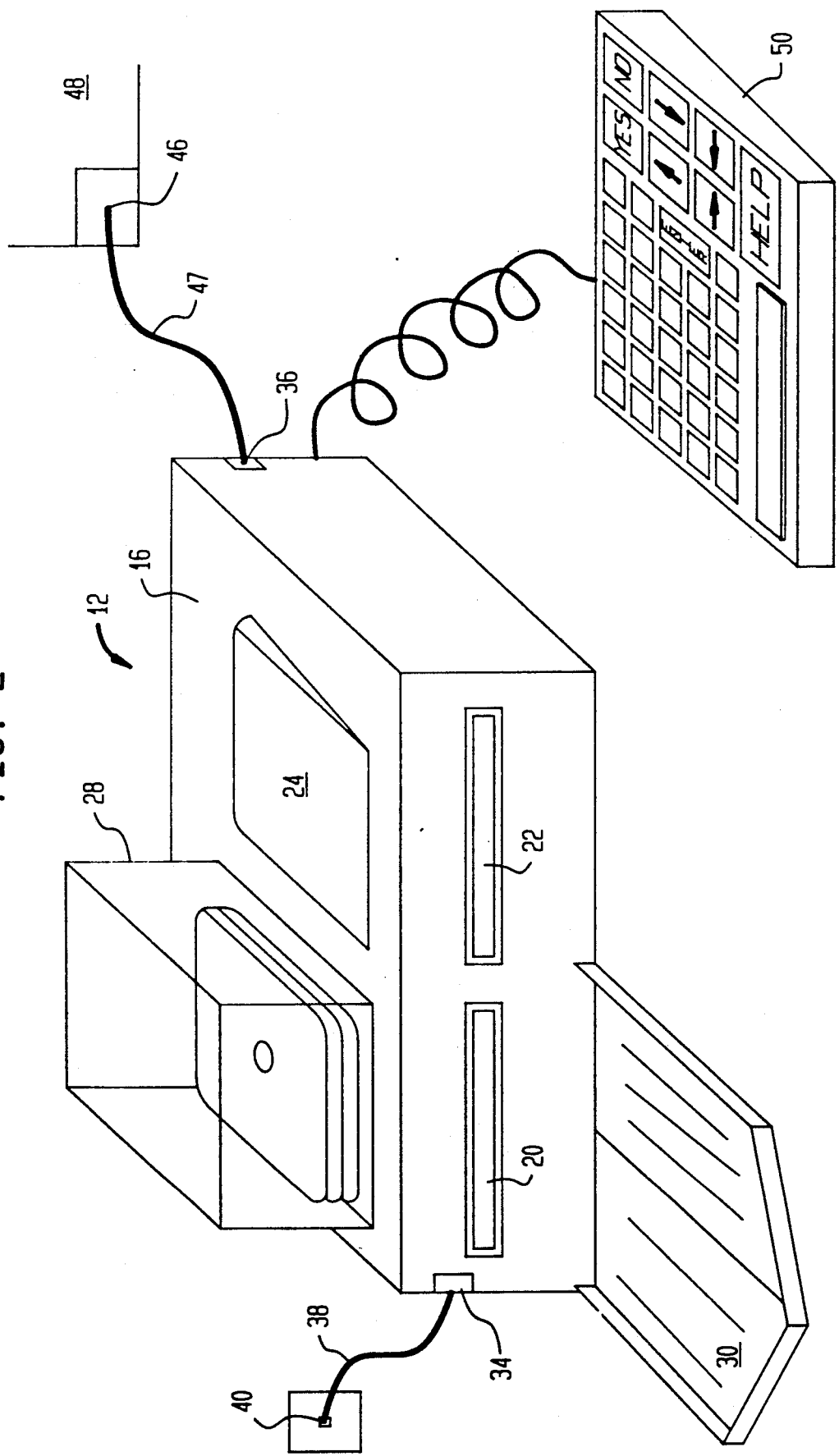
FIG. 2 is a front perspective view of the free standing data transfer device according to the present invention.
Figure 3:
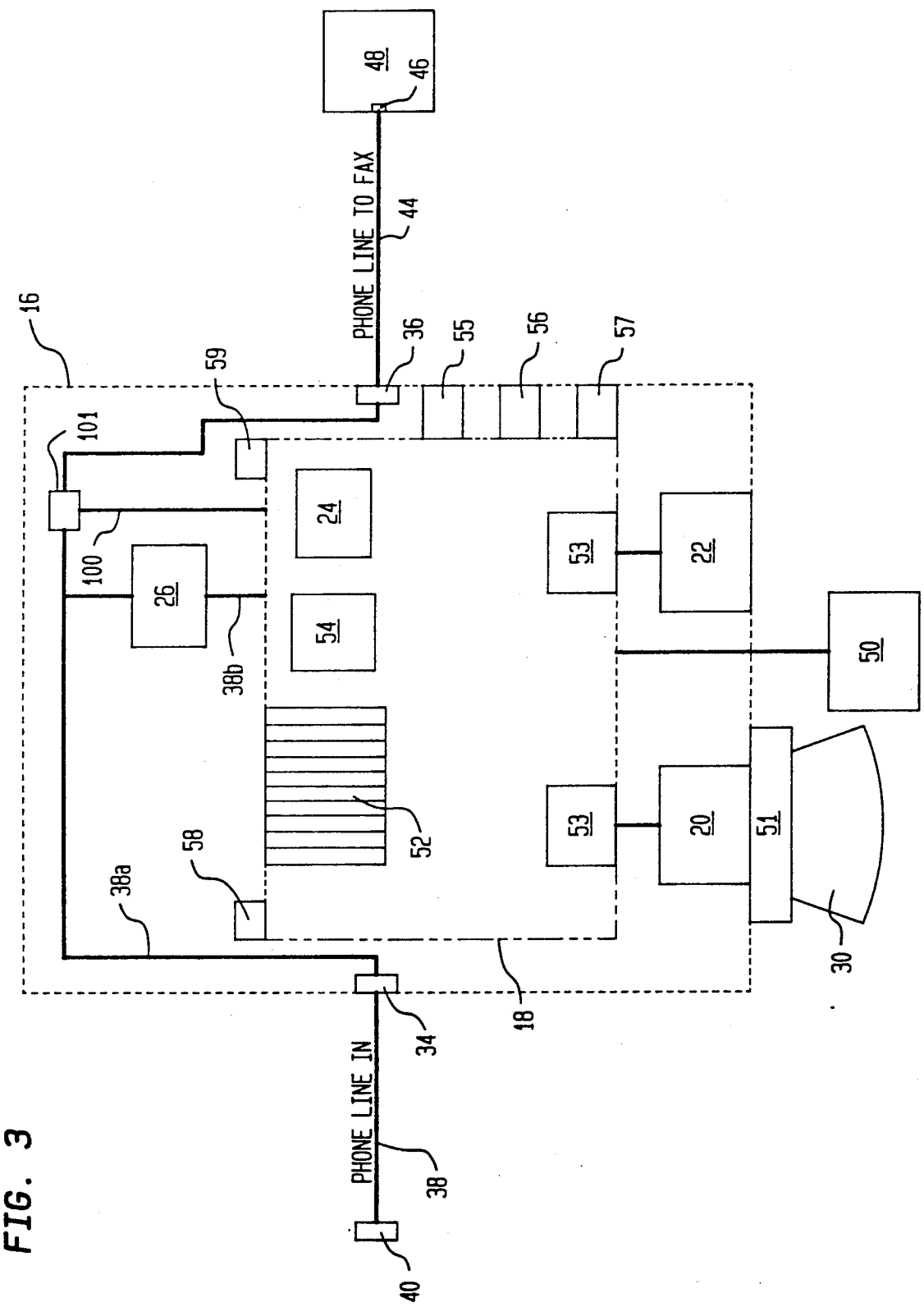
FIG. 3 is a specific schematic diagram of the free standing data transfer device according to the present invention and its components.
Figure 4:
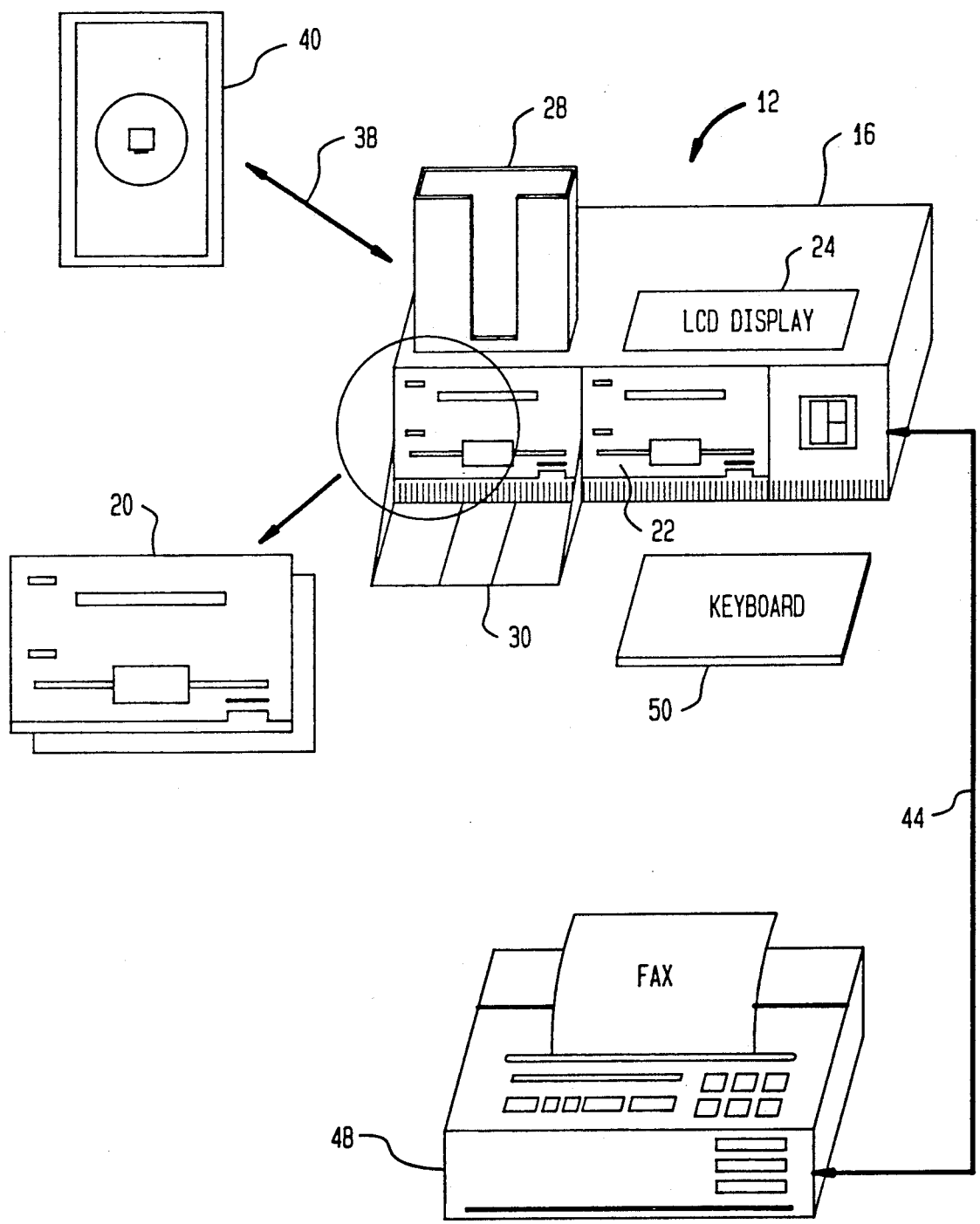
FIG. 4 is a general schematic diagram of the free standing data transfer device according to the present invention connected to a facsimile machine.
Figure 5:
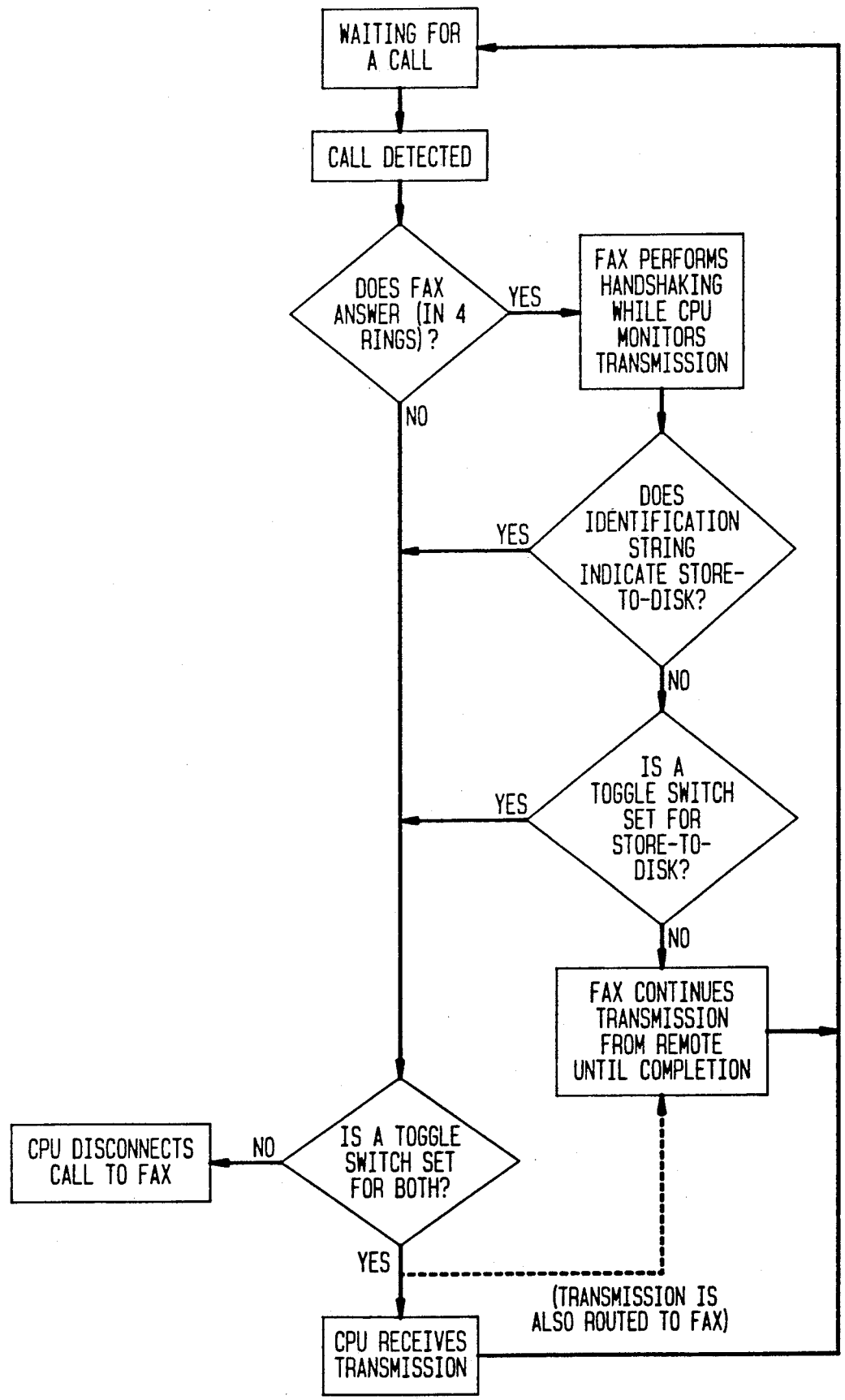
FIG. 5 is a flow chart representing the operation of the CPU of FIG. 3.

Applicant's novel system for transmitting binary data, picture data or text data will now be described by referring to FIGS. 1-3 of the drawings. The entire system is generally designated numeral 10. It has a pair of remotely located free standing data transfer device 12 that are connected together by conventional telephone transmission lines 14.

Each data transfer device 12 has a housing 16 within which is mounted a CPU 18 coupled to a, receiver disk drive 20, sending disk drive 22, LCD display 24, and modem 26. An autoloader 28 is mounted on top of housing 16. An ejected disk tray 30 is positioned in front of receiver disk drive 20. Housing 16 has a phone input terminal 34 and a phone output terminal 36. A line 38 is connected between phone outlet 40 and phone input terminal 34. A line 44 is connected between phone output terminal 36 and phone input terminal 46 of FAX machine 48 A line 38a couples the phone input terminal 34 to each of the modem 26 and the phone output terminal 36. A line 38b couples the modem 26 to the CPU 18. In addition, a line 100 couples the CPU 18 to a computer controlled switch mechanism 101. The computer controlled switch mechanism 101 is coupled to the line 38a between the modem 26 and the phone output terminal 36, as illustrated in FIG. 3. A keyboard 50 is connected through the rear of housing 16 to the CPU 18. A labeling device 51 can be placed inbetween the receiver disk drive 20 and the ejected disk tray 30. The CPU 18 of the data transfer device can have up to 5 expansion slots 52 that will accomodate networking or a more sophisticated monitor. Floppy disk drive controller cards 53 must be used as an interface between the CPU 18 and the sending disk drive 22 and receiver disk drive 20. A power supply 54 must also be used to supply adequate power to the data transfer device. If the data transfer device is configured with both 5¼" disk drives as well as 3½" disk drives. Then a disk preference toggle switch 55 will need to be set to indicate the users preference of disk sizes. A "call back while formatting disks" toggle switch 56 will be set if the CPU 18 of the data transfer device should terminate the phone call and call the sender back when a new disk needs to be formatted. A FAX/STORE-TO-DISK/BOTH toggle switch 57 is used by the CPU 18 of the data transfer device to determine what to do in the case when data is being received from a FAX. The user can also use this switch to force data to be sent to either the FAX, the receiver disk drive 20 of the data transfer device or both. A serial port 58 and a parallel port 59 are provided on the CPU 18 of the data transfer device so that both a printer and a scanner can be connected to the CPU 18.

WHEN THE FREE STANDING DATA TRANSFER DEVICE

The phone line in 38 is connected between the phone outlet 40 and the phone input terminal 34. Inside the housing 16, the input phone terminal 34 is connected to the phone line 38a, which is, in turn, is connected to the modem 26. If a call is detected, the data transfer device will first try and let the FAX answer the call. If there is a coupled to the line 44 FAX and the FAX answers the call, then the CPU 18 will monitor the information coming across the phone line with the demodulator inside the modem 26 via the line 38b, to determine whether the calling party is a FAX, a remote data transfer device, or a computer. The CPU 18 can always determine which device is sending a communication by reading the identification string of characters in the data transmission, as is well known in the data communication art. Within this string, specific information about the make and model of the remote transmitting device always transmitted. If the identification string contains preselected information to identify a data transfer device according to the present invention, then the sending device will be assumed to be a data transfer device or a computer under data transfer device emulation. If there is no identification string, the sending device will be assumed to be a personal computer using a standard communications software program. If the FAX does not answer the phone call within 4 rings, then the CPU 18 will assume no FAX is connected to the phone line 44, and the CPU 18 will answer the call via the modem 26.

RECEIVING INFORMATION FROM ANOTHER FREE STANDING DATA TRANSFER DEVICE

A user that is transmitting from a remote data transfer device will have already indicated whether the transmission is directed to the receiving data transfer device or the FAX coupled to the receiving data transfer device, or BOTH (the user menus are described later in this document). The user's selection will be transmitted in a single byte called the FAX/STORE-TO-DISK-/BOTH soft switch which is also part of the identification string. This soft switch will inform the CPU 18 of the ultimate destination of the transmission. If the FAX-/STORE-TO-DISK/BOTH soft switch is set to send the transmission to the FAX, the CPU 18 will simply remain idle while the transmission is taking place. If the FAX/STORE-TO-DISK/BOTH soft switch is set to send the information to the receiver disk drive 20 of the data transfer device, then the CPU 18 will disconnect the transmission through the phone line 38a, output terminal 36 and line 44 to the FAX, via the switching mechanism 101, and begin to accept the transmission. If the FAX/STORE-TO-DISK/BOTH soft switch is set to BOTH, the both the data transfer device and the FAX will accept the transmission.

RECEIVING INFORMATION FROM A FAX

When the data transfer device determines a transmission is coming from a FAX, the data transfer device will first find out if the local FAX answered the phone call. If the local FAX did not answer the call, then the data transfer device must take the transmission itself. If the FISK determines there is a FAX machine coupled to the phone line 44, then the CPU 18 will query the status of the hardware FAX/STORE-TO-DISK/BOTH switch 57 mounted on the side of the housing 16. The switch 57 will normally be set to the FAX position which means a transmission from a FAX will be directed to the FAX coupled to the phone 44. If the switch 57 is set to STORE TO DISK then the transmission will be accepted by the CPU 18 through the modem 26. If switch 57 is set to both, then the transmission will be accepted by both the CPU 18 and the FAX. The hardware switch 57 allows the user to store the transmissions in many different ways. If the transmission is determined to be directed to the local FAX, then the data transfer device will simply remain idle until the transmission is complete. If the transmission is to be sent to the receiver disk drive 20, then the CPU will terminate the communication over the phone line 38a, output terminal 36 and line 44, via the switching mechanism 101 and receive the transmission.

RECEIVING INFORMATION FROM A COMPUTER

If the data transfer device receives a transmission from a personal computer using a standard communications software program, the data transfer device will terminate the communication over the phone line out 44 to the FAX and receive the transmission. A FAX board on a personal computer will be assumed by the data transfer device to be a FAX machine. If a personal computer is using an emulation of the software of the CPU 18 of the data transfer device, then the data transfer device will assume the sending device to be a remote data transfer device.

If at any time the data transfer device receives an "Out of Disk Space" error message from the operating system, the CPU 18 will place a label on the diskette currently in the receiver disk drive 20, eject the diskette into the disk tray 30 in front of the unit housing 16, and pull a new diskette down from the autoloader 28. If the data transfer device cannot find a new diskette in the autoloader 28, the data transfer device will, send the error message "The remote device is out of disk space" to the sending machine, and then terminate the transmission. If the sending device receives the "The remote device is out of disk space" message, then it will display the message on the LCD screen 24, and sound a bell until a key on the keyboard has been pressed.

Some space on every diskette, hard disk, magnetic tape, or optical disk, in a receiver disk drive 20 is reserved for directory information.

This directory is a text file that contains the following information: date of transmission, time of transmission, sending party's phone number. Size of the file, type of file (as can best be determined), and the verbage that was printed on the label (if the sender opted to put a label on the disk).

If a disk is autoloaded into the receiver disk drive 20 and the disk is determined to be formatted, then the CPU 18 will erase the directory of the disk so the disk will be considered empty, allowing the disk to be completely re-filled.

The most efficient way to use a data transfer device according to the present invention is to always format the floppy disks before they are stacked into the autoloader 28. The formatting process can easily be accomplished by the CPU 18 of the data transfer device, However, it can be a time consuming process while the phone is connected to a long distance party. Therefore, the CPU 18 is equipped with a toggle switch called the "call back while formatting disks" switch 56. If the switch is set and the sending device is a data transfer device then the receiving data transfer device will query the sending data transfer device for its phone number. Then the receiving data transfer device will terminate the call, format the disk, and then call the original sender back, and resume the transmission. The remote data transfer device will respond with a busy signal to any caller until the remote data transfer device has completed the transmission with the original sender. The sending data transfer device will also be instructed not to receive any phone calls until the transmission is complete. The different kinds of formats supported in a data transfer device are as follows: single sided/single density, double sided/double density and high density. The storage capacitites are as follows: 180 kilobytes, 360 kilobytes, 740 kilobytes, 1.2 megabytes, and 1.4 megabytes. If the CPU 18 encounters a serious error while attempting to format a diskette, the CPU 18 will attempt to format the diskette with the next lowest density until the disk is successfully formatted. If the diskette cannot be successfully formatted, the data transfer device will eject the "bad disk" into the disk tray 30, and pull a new disk down from the autoloader 28 and try again. If there is more information on the sending disk than can be transferred to the receiving disk as a result of different formats. The receiving CPU 18 will require multiple diskettes to complete the transfer.

The CPU 18 will know to format the disk if the operating system returns a "general disk failure" error message. Also, if CPU 18 receives an instruction to make a duplicate disk copy of the whole disk and the format of the disk in the sending data transfer device is different than the format of the receiving data transfer device, then the receiving data transfer device will attempt to re-format the receiving disk to be identical to the sending disk.

WHEN THE DATA TRANSFER DEVICE INITIATES A CALL

The CPU 18 uses a menu driven interface to take instructions from a user. The LCD display 24 and the keyboard 50 allow the user to quickly and reasily indicate their choices (the menus are provided later in this document). The user can select many choices such as the destination device (Fax or data transfer device), a desired label on the diskettes, and the different people who are to receive the transmission. The user can also indicate whether individual files are to be transmitted, or if a complete disk copy is to be made. If individual files are being transmitted, then the remote data transfer device will simply add this information on to the disk that is currently in the disk drive labeled "RECEIVE". When this disk becomes full of individual files, then the label is placed on the disk, the disk is ejected into the disk tray 30, and a new disk is pulled down from the autoloader 28 above. If a complete copy is to be made of the sender's disk, then the CPU 18 of the receiving data transfer device will look to see if the disk currently in the drive labeled "RECEIVE" is empty. If the disk is empty, then this disk will be used to make the copy. If the disk is not empty, then CPU 18 will eject the partially used disk into the disk tray 30, pull down a new disk from the autoloader 28, make the duplicate copy, label the disk, eject the disk into the disk tray 30, and then pull a new disk down from the autoloader 28.

SENDING INFORMATION TO A REMOTE DATA TRANSFER DEVICE

If a data transfer device is sending information to another data transfer device then the local data transfer device will either dial the telephone number entered by the user, or look-up the telephone number inside the phone book kept in a RAM memory, and then dial the number. When the connection has been made to the remote device, the sending data transfer device will transmit an identification string indicating that the destination device is to be a data transfer device. When the sending data transfer device receives a "ready to receive" instruction from the remote data transfer device, (xon, xoff protocall), the sending data transfer device will begin to send the transmission.

SENDING INFORMATION TO A FAX

If a data transfer device is sending information to a FAX, then the CPU 18 will try to make a determination whether the data file contains image data in PCX format or if the data is in a text file format. If the information appears to be in PCX format, then the CPU 18 will scan the data file and transmit the proper scan lines in order for the remote FAX to print the appropriate graphic picture. If the file does not appear to be in PCX format, then the CPU 18 will attempt to read the file as if it were a standard text file, by reading in an entire line, and transmitting the proper scan lines to the FAX (similar to the way FAX pc boards operate now). If the data does not appear to be either PCX format or text format, then the CPU 18 will send the information as if the file were a text file.

SENDING INFORMATION TO A COMPUTER

If the user selects a remote computer to receive the transmission, then the CPU 18 will operate as if the remote device was a data transfer device, however, if an "out of disk space" error message is detected, then the transmission will be terminated.

ADDITIONAL OPTIONS

The data transfer device can be equipped with 5¼ inch disk drives, 3½ inch disks drives or both. If both the 5¼ inch drives and the 3½ inch drives are desired, there would be a total of 4 disk drives (two being autoloaded). A remote data transfer device will try to use the same size disk as the sending fisk. If the data transfer device has a problem determining which size disk to use, the CPU 18 will query a hardware switch 55 to find the users preferred disk size. If no more disks of that size can be found in the autoloader 28, then the CPU 18 will attempt to use the remaining different sized diskettes.

The CPU 18 will be able to have up to 8 personal computer style expansion slots, a parallel port 59, and a 25 pin RS-232 serial port 58. One or more expansion slots can be used to hold a "local area network" card such as Novell or Ethernet. The parallel port 59 can be used to attach a printer, and the serial port 58 can be used to attach a scanner.

The data transfer device can be a very important component part to a local area network that will handle all telecommunications. A local area network always has at least one node that a accesses information on the hard disk called the "file server". The data transfer device can be a node on the network that handles all the communications for each node on the network, and therefore be considered the "communications server". The data transfer device can also be designed to have multiple telephone lines coming both into the unit and going out from the unit to handle a large number of users on the network.

The data transfer device uses a relatively small LCD screen 24 that will display approximately 10 lines of 40 characters per line. The data transfer device could optionally allow a video card to be plugged into an expansion slot 52 and therefore a full size personal computer video monitor could be used.

The keyboard 50 is small and light containing the 26 letters of the alphabet, the numbers 0 thru 9, a space bar, an ENTER key, a YES key, a NO key, and 4 direction arrows.

The data transfer device can be equipped with a hard disk drive instead of a floppy drive and an autoloader.

This would be particularly useful in a network environment where the various nodes on the network could query the data transfer device set up as an alternative drive and given a drive letter such as e or f.

A data transfer device could additionally be equipped with a magnetic tape machine that could both read and write to tape instead of diskettes or a hard disk. This could be especially beneficial when the information to be transferred is music. The design and the functions of a data transfer device would be identical with the exception that the medium the data would be stored on is magnetic tape.

A data transfer device could also be equipped with an optical disk device that could both read and write to optical disk instead of any other electronic data storage medium. This could be especially beneficial when the information to be transferred is video in nature. Audio could also be effectively transmitted with this enhancement.

The data transfer device can be built with only a few features or with many features. The most simple data device contains only one disk drive, a modem, a keyboard, and an LCD display, and an option for a serial and a parallel port. There is no autoloading capability and no disk ejection capability with this simple configuration. This unit will be well suited for somebody who does not send data files very frequently, and who cannot afford a more expensive unit. This low end data transfer device will simply be a single diskette attachment to their existing fax machine. A sophisticated data transfer device can contain all or a few of the following: (2) 5¼" disk drives as well as (2) 3½" disk drives, (2) autoloaders, a hard disk drive, a printer, a scanner, a tape machine, an optical disk machine, a personal computer style monitor, OCR software, Cross Comilation software, and Network hardware and other kinds of hardware plugged into the expansion slots in the motherboard of the data transfer device. These additional features will provide solutions for specific data transmission problems for many kinds of businesses. The data transfer device could potentially be outfitted with many different kinds of diskette autoloaders. Datapath Technologies, Inc. In Fremont, Calif. has developed an autoloader that is well suited for the FISK. Many other companies that manufacture disk duplication equipment also have autoloaders that could be used effectively on the data transfer device. The data transfer deivce, however, will probably be equipped with an autoloader that is manufactured specifically for the data transfer device. The autoloader will be directly connected to a floppy disk drive such as a TEAC FD55BR, 5¼", 48TPI, 360 K drive. The autoloader will also have it's own controller board that will be able to send commands such as "eject a disk", and "load a new disk". A graphic image on the data transfer device should always be stored in PCX format. The data transfer device will always compress the information before it is transmitted. If the transmission is directed toward another data transfer device, a data compression routine such as one supplied by Pkware, Inc. in Glendale, Wis., will be initiated. The Pkware compression software will determine the best method of compressing the data to be transferred. Compression will be performed on picture data, text data, and binary data. At the receiving end, the uncompression software will open the previously transferred file, read the header information from the file, and begin to properly uncompress the data. The data transfer device may also have proprietary compression/uncompression software embedded in ROM memory that will accomplish the same purpose. If the sending data transfer device determines the receiving device is a FAX, then the data transfer device will be able to choose from three different compression techniques as follows: MR, M2R, and MH. The data transfer device will be equipped with an encoder that will allow picture or text data to be properly compressed and uncompressed. These compression techniques will greatly improve the time it takes to transmit the data.

The CPU 18 of the data transfer device can have many application programs in ROM memory. One of these is optical character recognition (OCR). This program can read the contents of an image file and convert the image into a much smaller text file that can then be manipulated by a word processor. Another software program that can be made available on the CPU 18 of the data transfer device is a cross compiler. A cross compiler can take an executable file and make the appropriate adjustments in order to create another executable file that can operate on a different operating system. The operator of the data transfer device would use the keyboard 50 to indicate which of these software programs is selected, and which file needs to be translated. The files to be converted would need to be in the disk drive labeled "SEND" in order to keep the disk drive labeled "RECEIVE" prepared for an incoming call. This process would need to take place when the data transfer device is not on-line with a remote device. If a phone call came in to the data transfer device, the software program currently running would be suspended until the phone call has been completed, then the software program would resume operation.

The data transfer device could be used to duplicate diskettes. The master disk can be placed into the disk drive labeled "SEND". The autoloader can be filled with up to 60 blank diskettes. The keyboard 50 of the data transfer device can then be used to indicate how many copies are to be made. (An exceptable option is to copy all of the disks in the autoloader.) The CPU 18 would then make all the copies indicated, and could also label each one.

The data transfer device can be set to automatically format disks. The autoloader 28 can be first filled with up to 60 blank diskettes. The keyboard 50 can then be used to indicate how many disks are to be formatted. (An exceptable option is to format all of the disks in the autoloader.) The CPU 18 would then format all the specified diskettes.

The labeling mechanism can be handled in two ways. The simplest method is to use the printer attached to the parallel port 59 to print the information on tractor fed disk labels. One for each disk that lands in the disk tray in front of the data transfer device. A more sophisticated approach is to place a small ink jet printer inside the autoloader 28, above the disk in the floppy disk drive that will print on a blank label that was placed on the disk by the user before the disk was dropped into the autoloader 28. The most sophisticated method is to have a small printer inside the autoloader 28, above the disk in the floppy disk drive that will print the label, then feed the label thru a cutter that will remove the back of the label exposing the sticky side of the label. Then a small roller can place pressure on the label making the label stick on the disk.

SYSTEM MENUS

The software that operates the CPU 18 will be completely menu driven, displaying commands on the LCD display 24, and receiving commands from the keyboard 50. After turning the CPU 18 "ON", the main menu will appear on the LCD display 24.

The LCD display 24 will display a main menu as follows:

---
FISK MAIN MENU
---
1. TRANSFER FILE(S)
2. SET-UP PHONE BOOK
3. SEND A QUICK MEMO
4. OCR OR CROSS COMPILE
5. DISK UTILITIES
---

If the user selects the "transfer file(s)" option, the following screen will appear:

---
TRANSFER FILES
---
1. TRANSFER THE ENTIRE DISK
2. TRANSFER INDIVIDUAL FILES
3. GO BACK TO THE MAIN MENU
---

If the user selects the "transfer individual files" option, a screen will appear that will allow them to indicate the files they want to be transferred as follows:

---
| → FILE1.001 | FILE5.001 | FILE09.001 | FILE13.001 |        |
|-------------|-----------|------------|------------|--------|
| FILE2.001   | FILE6.001 | FILE10.001 | FILE14.001 |        |
| FILE3.001   | FILE7.001 | FILE11.001 | FILE15.001 |        |
| FILE4.001   | FILE8.001 | FILE12.001 | FILE16.001 | MORE...|
---

By using the arrow keys on the keyboard, the user can point to the different file names on the disk in the "sending" disk drive 22. When the user presses the ENTER key on the keyboard 50. The file name being pointed to is highlighted and therefore selected to be transferred.

As soon as the disk knows which files are designated to be transferred, the following screen will appear:

---
DO YOU WANT TO COPY THE FILES TO A
SPECIFIC SUBDIRECTORY?
ENTER YES OR NO
---

If the user selects YES, the following screen will appear:

---
ENTER THE SUBDIRECTORY NAME
THEN PRESS ENTER.
---

As soon as the subdirectory information is entered, then the next screen will appear:

---
WOULD YOU LIKE TO USE THE PHONE BOOK Y/N?
---

If the user answers NO by pressing the 'N' key, then the following screen will appear:

---
PLEASE ENTER PHONE NUMBER
---

If the user answers YES to the question "Would you like to use the phone book" by pressing the 'Y' key, then the following screen will appear:

---
| → ALAN SMITH       | MARK MAYS      | RED CROSS      |        |
|--------------------|----------------|----------------|--------|
| BELL LABORATORIES  | NANCY CRAMER   | SAM SMITH      |        |
| JOHNSON & JOHNSON  | OLIVER TERRELL | STEVE SIMONE   |        |
| KELLY THOMPSON     | PAUL MARTIN    | TOM JAMES      |        |
| LESLIE JONES       | PETE HANSON    | VICTOR SHERIDAN| MORE...|
---

By using the arrow keys on the keyboard 50, the user can point to the different names that are currently in the phone book. When the user presses the ENTER key on the keyboard, the name being pointed to is highlighted and therefore selected to be called.

At this point the CPU 18 knows which files will be transferred and who will receive the transmissions. Then the following screen will appear:

---
TRANSFER FILES
---
1. TRANSFER DATA TO THE REMOTE data transfer device
2. TRANSFER DATA TO THE REMOTE FAX
3. TRANSFER TO BOTH data transfer device AND FAX
4. TRANSFER DATA TO A PERSONAL COMPUTER
5. GO BACK TO THE MAIN MENU
---

If the destination device selected above is the data transfer device or BOTH, then the following question will appear:

---
ENTER THE LABEL TO BE PLACED ON THE DISKETTE
---

The final question will then be asked as follows:

---
ARE YOU READY TO START TRANSMITTING Y/N
---

If the user presses 'Y', then the transmission will begin. If the user presses 'N', then the CPU 18 will return to the main menu.

If the user selects "set-up phone book", the following screen will appear:

---
SET-UP PHONE BOOK
---
1. DISPLAY PHONE BOOK ENTRIES
2. ADD A LISTING
3. EDIT A LISTING
4. DELETE A LISTING
---

-continued

| SET-UP PHONE BOOK |
|---|
| 5. GO BACK TO THE MAIN MENU |

The user can select these options in order to define companies and individuals that commonly receive transmissions.

If the user selects "send a quick memo", then the user will first be asked to enter the memo. Then the user will either select the telephone number to be dialed, or use the phone book to indicate the people who are supposed to receive the transmission. The user can also indicate whether the transmission will be sent to the remote data transfer device or the remote FAX.

If the user selects "OCR or cross compile", the following screen will appear:

| OCR OR CROSS COMPILE |
|---|
| 1. OPTICAL CHARACTER RECOGNITION |
| 2. CROSS COMPILE |
| 3. GO BACK TO THE MAIN MENU |

The user has many options at this point. The OCR and the cross compile can be performed either locally, or during the data transfer process. Similar to the "Transfer File(s)" menu option, the CPU 18 of the data transfer device will present many screens asking the user to enter the appropriate instructions.

If the user selects "disk utilities", the following screen will appear:

| DISK UTILITIES |
|---|
| 1 DISPLAY FILES ON "SENDING" DISK DRIVE |
| 2. DISPLAY FILES ON "RECEIVING" DISK DRIVE |
| 3. EDIT A FILE |
| 4. DUPLICATE DISKS |
| 5. FORMAT DISKS |
| 6 GO BACK TO THE MAIN MENU |

The user can display information on file to either the LCD display or to the local FAX. The user can also edit a file if a correction needs to be made, and the user can additionally duplicate a batch of disks locally.

We claim:

1. For use in connection with an incoming telephone line transmitting electronically represented data and a facsimile machine, a free standing data transfer device for controllably coupling the facsimile machine to the incoming telephone line, said free standing data transfer device comprising:
   a) a telephone input terminal adapted for coupling to the incoming telephone line, for receiving the electronically represented data;
   b) a modem coupled to the telephone input terminal for receiving and capturing the electronically represented data from the input telephone terminal;
   c) a process or electronically coupled to the modem for input of the captured electronically represented data from the modem;
   d) a data storage device electronically coupled to the processor for storing the electronically represented data;
   e) an output telephone terminal coupled to the input telephone terminal and adapted for coupling to the facsimile machine;
   f) a computer controller switch mechanism electronically coupled to the processor and intercoupling the input telephone terminal to the output telephone terminal; and
   g) means for input of data transmission control information coupled to the processor;
   h) the processor operating the computer controlled switch mechanism and the data storage device so as to cause the transmission of the electronically represented data from the input telephone terminal be sent only directly to the facsimile machine coupled to the output telephone terminal via the computer controlled switch mechanism, only directly to the data storage device via the modem and the processor or to both the facsimile machine and the data storage device, as a function of the data transmission control information.

2. The free standing data transfer device of claim 1, wherein the means for input of data transmission control information comprises a portion of the electronically represented data.

3. The free standing data transfer device of claim 2, wherein the data transmission control information represents one of three states:
   a first state representing control information for the transmission of the electronically represented data from the input telephone terminal only directly to the facsimile machine coupled to the output telephone terminal via the computer controlled switch mechanism.
   a second state representing control information for the transmission of the electronically represented data from the input telephone terminal only to the data storage device via the modem and the processor, and
   a third state representing control information for the transmission of the electronically represented data from the input telephone terminal to both the facsimile machine and the data storage device.

4. The free standing data transfer device of claim 3, wherein the processor monitors the electronically represented data transmitted on the incoming telephone line via the modem, for processing of the data transmission control information contained therein to determine the state of the data transmission control information and, thereafter, operates the computer controlled switch mechanism and the data storage device so as to cause the transmission of the electronically represented data from the input telephone terminal only directly to the facsimile machine coupled to the output telephone terminal via the computer controlled switch mechanism, only to the data storage device via the modem and the processor or to both the facsimile machine and the data storage device, as a function of the state of the processed data transmission control information.

5. The free standing data transfer device of claim 1, wherein the means for input of data transmission control inforamtion comprises a toggle switch coupled to the processor.

6. The free standing data transfer device of claim 5, wherein the toggle switch includes an output controllably setable to any one of three states:
   a first state representing control information for the transmission for the electronically represented data from the input telephone terminal only directly to the facsimile machine coupled to the output telephone terminal via the computer controlled switch telephone terminal via the computer controlled switch mechanism, a second state representing control information for the transmission of the electronic represented data from the input telephone terminal only to the data storage device via the modem and the processor, and a third state representing control information for the transmission of the electronically represented data from the input telephone terminal to both the facsimile machine and the data storage device;

the output of the toggle switch being coupled to the processor.

7. The free standing data transfer device of claim 6, wherein the toggle switch is a manual toggle switch.

8. The free standing data transfer device of claim 1, wherein the data storage device comprises a disk drive.

9. The free standing data transfer device of claim 8, further comprising an ejected disk tray attached to the front of the disk drive.

10. The free standing data transfer device of claim 1, wherein the processor is configured to convert the input electronically represented data into a format that is compatible for processing by a word processing program.

11. The free standing data transfer device of claim 1, further comprising an LCD display coupled to the processor.

12. The free standing data transfer device of claim 1, further comprising a keyboard coupled to the processor.

13. The free standing data transfer device of claim 1 further comprising a free standing housing arranged to enclose each of the telephone input terminal, modem, processor, data storage device, output telephone terminal and computer controlled switch mechanism.

14. The free standing data transfer device of claim 1 further comprising a serial port coupled to the processor.

15. The free standing data transfer device of claim 1 further comprising a parallel port coupled to the processor.

16. The free standing data transfer device of claim 1 wherein the processor includes a plurality of expansion slots.

* * * * *